United States Patent [19]

Jones

[11] Patent Number: 5,240,689
[45] Date of Patent: Aug. 31, 1993

[54] PROCESS USING TWO-STAGE BOILER INJECTION FOR REDUCTION OF NITROGEN

[75] Inventor: Dale G. Jones, Visalia, Calif.

[73] Assignee: Noell, Inc., Herdon, Va.

[21] Appl. No.: 769,588

[22] Filed: Oct. 2, 1991

Related U.S. Application Data

[63] Continuation of Ser. No. 401,431, Jun. 19, 1989, abandoned.

[51] Int. Cl.⁵ .............................................. C01B 21/00
[52] U.S. Cl. .................................................... 423/235
[58] Field of Search ................... 423/235, 235 D, 239, 423/239 A

[56] References Cited

U.S. PATENT DOCUMENTS

| | | | |
|---|---|---|---|
| 3,801,696 | 4/1974 | Mark | 423/212 |
| 3,900,554 | 8/1975 | Lyon | 423/235 |
| 4,115,515 | 9/1978 | Tenner et al. | 423/235 |
| 4,208,386 | 6/1980 | Arand et al. | 423/235 |
| 4,213,944 | 7/1980 | Azuhata et al. | 423/235 |
| 4,325,924 | 4/1982 | Arand et al. | 423/235 |
| 4,350,669 | 9/1982 | Izumi et al. | 423/235 |
| 4,507,269 | 3/1985 | Dean et al. | 423/235 |
| 4,624,840 | 11/1986 | Dean et al. | 423/235 |
| 4,719,092 | 1/1988 | Bowers | 423/235 |
| 4,743,436 | 5/1988 | Lyon | 423/235 |
| 4,751,065 | 6/1988 | Bowers | 423/235 |
| 4,770,024 | 10/1988 | Epperly et al. | 423/235 |
| 4,770,863 | 9/1988 | Epperly et al. | 423/235 |
| 4,777,024 | 10/1988 | Epperly et al. | 423/235 |
| 4,780,289 | 10/1988 | Epperly et al. | 423/235 |
| 4,802,059 | 2/1989 | Sullivan et al. | 423/235 |
| 4,830,839 | 5/1989 | Epperly et al. | 423/235 |

FOREIGN PATENT DOCUMENTS

| | | |
|---|---|---|
| 2630202 | 7/1976 | Fed. Rep. of Germany . |
| 50-67669 | 6/1975 | Japan . |
| 51-1138 | 1/1976 | Japan . |
| 51-12330 | 1/1976 | Japan . |
| 51-4588 | 2/1976 | Japan . |
| 51-76166 | 7/1976 | Japan ................... 423/235 |
| 61-89176 | 8/1976 | Japan . |
| 51-89176 | 8/1976 | Japan . |
| 51-104948 | 9/1976 | Japan . |
| 52-77877 | 6/1977 | Japan . |
| 52-85056 | 7/1977 | Japan . |
| 53-30975 | 3/1978 | Japan . |
| 53-30976 | 3/1978 | Japan ................... 423/235 |
| 53-33975 | 3/1978 | Japan ................... 423/235 |
| 53-76968 | 7/1978 | Japan . |
| 53-76969 | 7/1978 | Japan . |
| 53-79762 | 7/1978 | Japan ................... 423/235 |
| 54-99773 | 8/1978 | Japan . |
| 53-109866 | 9/1978 | Japan ................... 423/235 |
| 53-128023 | 11/1978 | Japan . |
| 53-130274 | 11/1978 | Japan ................... 423/235 |
| 53-149166 | 12/1978 | Japan ................... 423/235 |
| 54-123573 | 9/1979 | Japan . |

Primary Examiner—Gregory A. Heller
Attorney, Agent, or Firm—Christie, Parker & Hale

[57] ABSTRACT

This invention relates to methods and apparatus for reducing NOx in combustion effluent gases which comprise a two-stage injection process. NHi precursors (such as liquid-phase urea or ammonium hydroxide, or the like) are injected into the flue gas at temperatures greater than 1400° F. in a first injection zone to reduce NO to nitrogen. This step is followed by injecting a peroxyl initiator, such as a hydrocarbon material (for example, methanol) into the flue gas at temperatures less than 1400° F. to oxidize residual NO to $NO_2$ in a second injection zone.

7 Claims, 8 Drawing Sheets

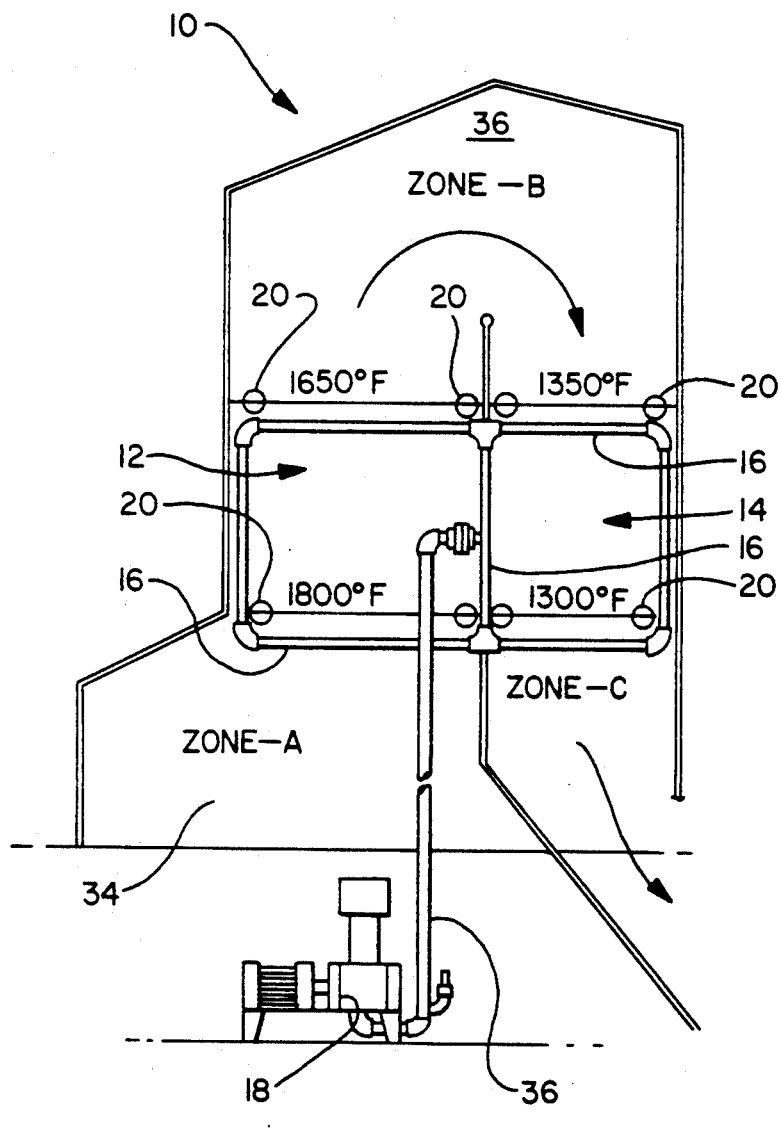

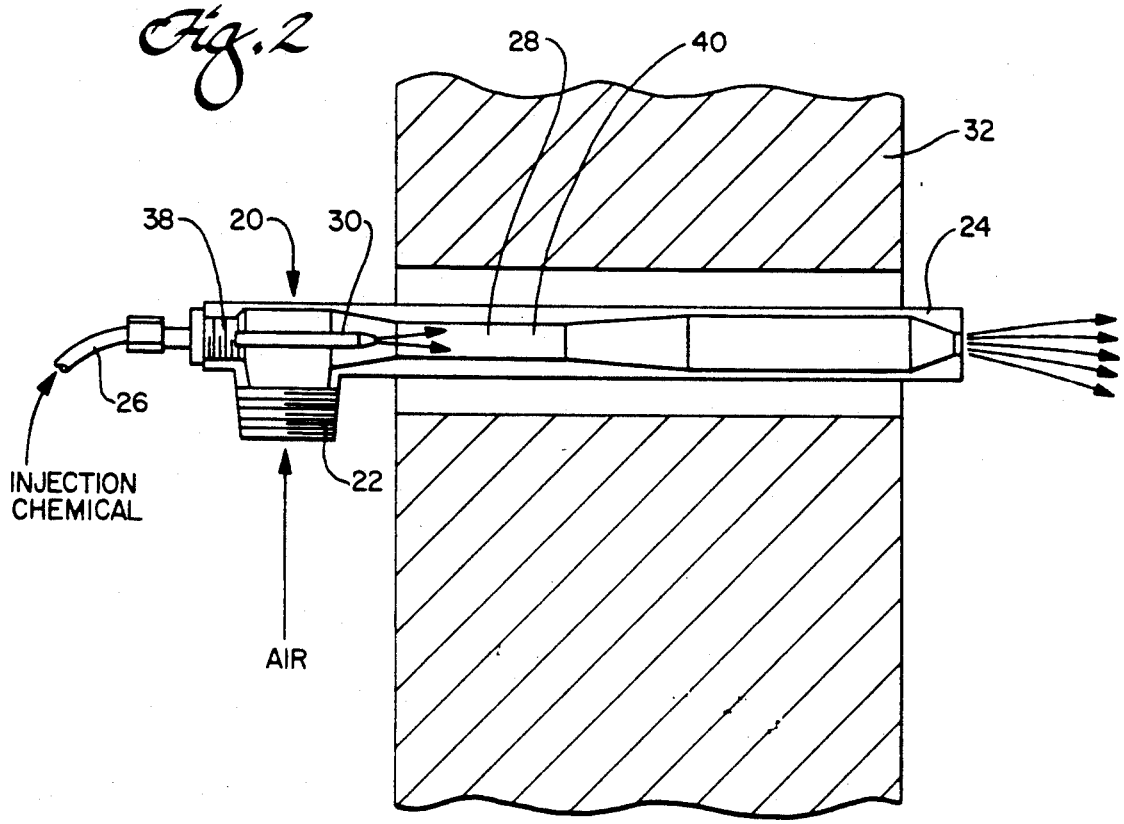
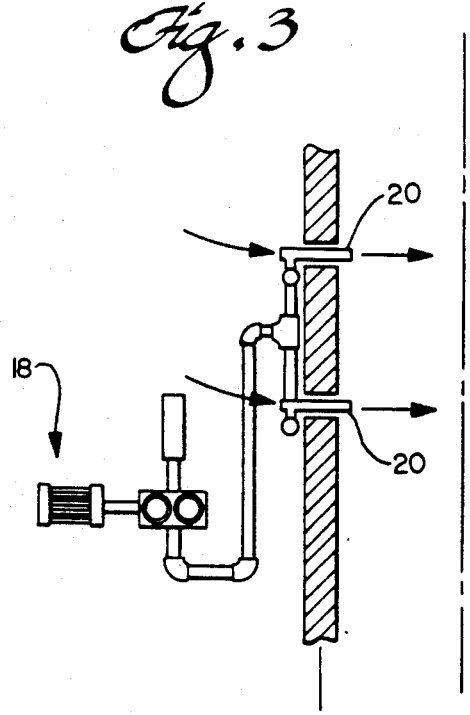
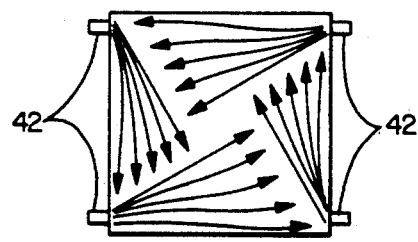

NOx REMOVAL PERFORMANCE OF UREA AT HIGH TEMPERATURE IN THE FIRST INJECTION STAGE

EFFECT OF UREA INJECTION ON CO EMISSIONS AT HIGH TEMPERATURE IN THE FIRST INJECTION STAGE

EFFECT OF HYDROCARBON PRESENCE ON $NO_x$ REMOVAL WITH UREA

EFFECT OF ASH AND AMMONIA ON NO TO NO2 CONVEVRSION WITH METHANOL AT LOW TEMPERATURE IN THE SECOND INJECTION STAGE

EFFECT OF METHANOL ADDITION ON CO EMISSION AT LOWER TEMPERATURE IN THE SECOND INJECTION STAGE

EFFECT OF METHANOL ADDITION ON AMMONIA SLIP AT LOWER TEMPERATURE IN THE SECOND INJECTION STAGE

PROCESS USING TWO-STAGE BOILER INJECTION FOR REDUCTION OF NITROGEN

This is a continuation of application Ser. No. 07/401,431, filed Jun. 19, 1989 now abandoned.

FIELD OF THE INVENTION

This invention relates to techniques for removing oxides of nitrogen from combustion effluent gases. More particularly, this invention relates to techniques for converting nitric oxide (NO) to both nitrogen ($N_2$) and nitrogen dioxide ($NO_2$) and for removing the nitrogen dioxide from the flue gas prior to discharge of the flue gas into the atmosphere.

BACKGROUND OF THE INVENTION

Coal-fired utility boilers produce NOx and $SO_2$ emissions which cause acid rain. Extensive studies have shown that the NOx-related portion of acid rain components can produce extensive damage to trees and forests, and NOx control technology for coal-fired boilers may become required in many industrialized nations, in addition to the NOx controls presently required in Japan and West Germany. NOx control is also an important consideration for incineration systems, where there is currently no demonstrated NOx control technology for achieving 70% or more NOx removal.

Many existing coal-fired boilers or solid waste incinerators already have wet scrubbers for controlling $SO_2$ or HCl emissions. Specifically, wet scrubbers have been installed on about 60,000 MWe of coal-fired generating capacity in the U.S. and on about 40,000 MWe in West Germany Many other countries are presently requiring the installation of wet scrubbers for coal-fired boilers and solid waste incinerators. The present invention provides a means for achieving very high levels of NOx removal, on the order of 70% or more, especially in situations where coal-fired boilers or incinerators already have wet scrubbers. This invention can provide such NOx removal performance levels without the use of expensive catalytic NOx reduction techniques.

Presently-commercialized technology for NOx control consists primarily of Selective Catalytic Reduction (SCR), where ammonia gas is injected into the flue gas and reacted with NOx over a catalyst at temperatures of about 700° F. to produce nitrogen gas and water vapor byproducts Typical NOx reduction levels are 80%. The catalyst bed is typically sized sufficiently large to reduce the ammonia slippage to avoid contamination of the flyash with ammonium salt deposits. As used herein, "ammonia slippage" or "ammonia slip" means the concentration of ammonia gas contained in the flue gas exit from the NOx control process. The reported cost of SCR technology varies between about $60/kw to $120/kw, depending on site conditions. The operating cost of SCR technology includes the high cost of catalyst replacement about once every two years. SCR technology is not considered applicable for incinerators due to the contamination and poisoning of the catalyst. The purpose of the present invention is to provide similar high levels of NOx removal performance without requiring the use of SCR technology, at an extremely significant savings in both capital and operating cost.

There are other NOx control processes using NHi precursors such as gaseous ammonia or liquid-phase urea, which are injected into the flue gas at temperatures above 1400° F. to reduce NO to nitrogen. These processes are called Selective Non-Catalytic Reduction (SNCR), and suffer the disadvantage that if sufficient NHi precursor material is injected to achieve high NOx removal efficiency, then there may be an unacceptably high degree of ammonia slippage. The ammonia slip combines with $SO_2$, $SO_3$, HCl and HF to form ammonium salts at temperatures typically less than 500° F. When such salts condense, solid particulate is formed which may cause deposits in critical zones such as the air preheater system in conventional boilers. In order to prevent this problem, less of the NHi precursor material is injected, and the overall NOx reduction capability of SNCR systems is generally limited to between 30% and 60%. This level of performance does not compete with SCR systems, and is unacceptably low.

Typical SNCR processes are taught by R. K. Lyon, U.S. Pat. No. 3,900,554, and A. M. Dean et. al., U.S. Pat. No. 4,624,840, (Exxon Thermal DeNOx Process using gaseous ammonia) and by J. K. Arand et. al., U.S. Pat. No. 4,208,386 and U.S. Pat. No. 4,325,924 (EPRI/Fuel Tech NOxOUT Process using liquid-phase urea). U.S. Pat. Nos. 3,900,554, 4,624,840, 4,208,386 and 4,325,924 are incorporated herein by reference Both the Exxon and Fuel Tech processes operate preferably only within a narrow temperature window, typically between 1700° and 1900° F., but can operate at somewhat lower temperatures by addition of hydrogen or hydrocarbon materials to the flue gas. Typically, hydrogen is added in the Exxon process and methanol is added in the Fuel Tech process. The actual NO reduction mechanism is believed to involve a large number of radical reactions, the most important being:

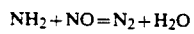

$$NH_2 + NO = N_2 + H_2O$$

By use of hydrogen or hydrocarbon addition, the normal temperature window (i.e., 1800° F.±100° F.) can be lowered, for example, to 1500° F.±100° F. This involves sufficient hydrocarbon addition to increase the concentration of hydroxyl (OH) radicals, thereby increasing the concentration of $NH_2$ radicals at lower temperatures and decreasing the ammonia slippage by the reaction:

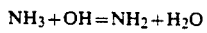

$$NH_3 + OH = NH_2 + H_2O$$

However, this technique of adjusting the optimum temperature for an SNCR process to lower levels by addition of hydrogen, hydrogen peroxide, or hydrocarbons becomes limited below about 1500° F. Below 1400° F., the NO reduction efficiency of SNCR processes decreases dramatically, until below about 1300° F. there is practically no reduction whatsoever.

As used herein, the term "temperature window" means the range of temperatures over which SNCR processes are effective in reducing NO to nitrogen. Typically, at very high temperatures, there is not any NO reduction. As the temperature is decreased, NO reduction performance increases until, at an optimum temperature, the NO reduction performance is maximized. Further reductions in flue gas temperature cause both rapidly increased ammonia slippage and decreased NO reduction performance, until the lower-temperature edge of the temperature window is reached, below which point there is no longer any NO reduction. As used herein, the term "optimum temperature" means the flue gas temperature for which the NO reduction performance of an SNCR process is maximized The term "SNCR process" means the use of simple or complex NHi precursors which are injected into flue gas at temperatures within the temperature window, resulting in the selective, non-catalytic reduction of NO to nitrogen. The term "simple NHi precursors" means ammonia, or other compounds, such as ammonium hydroxide or ammonium carbonate, or mixtures thereof, which liberate ammonia ($NH_3$) upon thermal decomposition. The term "complex NHi precursors" means urea ($(NH_2)_2CO$), cyanuric acid, biuret, triuret, ammelide, other amides, or mixtures thereof, which initially liberate $NH_2$ radicals upon thermal decomposition.

Another type of flue gas NOx control process which oxidizes NO to $NO_2$ is disclosed in U.S. Pat. application titled: PROCESS AND APPARATUS FOR REMOVING OXIDES OF NITROGEN AND SULFUR FROM COMBUSTION GASES, Ser. No. 734,393, filed May 14, 1985 by me, now U.S. Pat. No. 4,783,325. The process disclosed in the U.S. Pat. application Ser. No. 734,393, is herein referred to as the "Jones process." U.S. Pat. No. 4,783,325 is incorporated herein by this reference. The Jones oxidation process operates between 800° F. to 1400° F., and utilizes a hydrocarbon material (a peroxyl initiator), such as methanol, dispersed in an air carrier to cause high levels of NO oxidation to $NO_2$. The preferred temperature window for this process is from 800° F. to 1400° F. This process is a different type of boiler injection process involving the peroxyl radical ($HO_2$) instead of hydroxyl radical (OH). NO is oxidized to $NO_2$ by the reaction ps 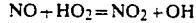
$NO + HO_2 = NO_2 + OH$ It is seen that some appropriate temperature, say 1400° F., acts as a dividing line between the NO reduction processes of the SNCR type (i.e., at 1400° F. and higher) and the NO oxidation processes of the Jones type (i.e., at 1400° F. and lower).

SUMMARY OF THE INVENTION

This invention relates to methods for reducing NOx in combustion effluent gases. The method includes the steps of injecting NHi precursors into a flue gas in a first injection zone, wherein the flue gas is at a temperature of greater than about 1400° F., to reduce NO to $N_2$. The second step is to inject a peroxyl initiator into the flue gas in a second zone, wherein the flue gas is at a temperature of less than about 1400° F., to oxidize residual NO to $N_2$.

BRIEF DESCRIPTION OF THE DRAWINGS

These and other features, aspects and advantages of the present invention will be more fully understood when considered with respect to the following detailed description, appended claims, and accompanying drawings, wherein:

FIG. 1 is a schematic view of a two-stage boiler used for describing a preferred embodiment of a two-stage injection process provided in accordance with practice of principles of the present invention.

FIG. 2 is a schematic cross-sectional view of a preferred embodiment of an injection nozzle provided in accordance with practice of principles of the present invention, for injection NHi precursors and/or peroxyl initiators.

FIG. 3 is a schematic view of a preferred embodiment of an injector system for injecting the NHi precursors and/or peroxyl initiators provided in accordance with practice of principles of the present invention.

FIG. 4 illustrates a preferred flow pattern for the NHi precursors and peroxyl initiators introduced by injection nozzle assemblies provided in accordance with the present invention.

DETAILED DESCRIPTION

Figure 5:
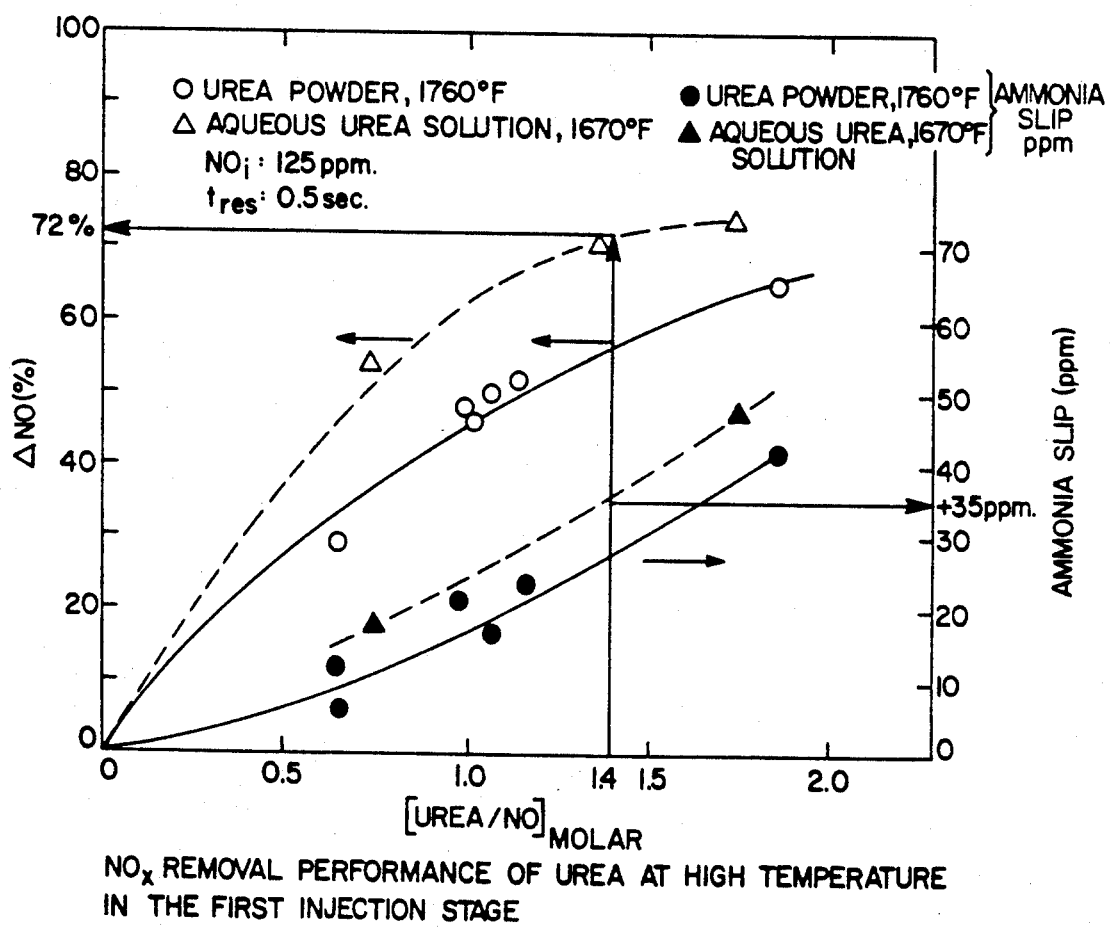
FIG. 5 is a graph showing the change in NO concentration as a function of the molar ratio of the urea injected into the flue gas to the NO concentration in the flue gas at both 1670° F. and 1760° F.

Referring to FIG. 1, there is shown a schematic view of a two-stage boiler 10 useful in practice of the process of the present invention for reducing oxides of nitrogen in a flue gas stream. The process comprises first reducing NO to nitrogen by injecting NHi precursors (such as liquidphase urea or ammonium hydroxide) into flue gas in a first injection zone 12 at temperatures greater than 1400° F.; and second, reducing additional NO to nitrogen, oxidizing residual NO to $NO_2$, and reducing ammonia slippage by injecting a peroxyl initiator, such as hydrogen, hydrogen peroxide, or hydrocarbon material (such as methanol), into the flue gas in a second injection zone 14 at temperatures less than 1400° F. Additional NHi precursors include ammonia and more complex compounds, such as cyanuric acid, biuret, triuret, ammelide, or mixtures thereof. If the flue gas temperature in the first zone 12 falls below the optimum level, then hydrogen, hydrogen peroxide or hydrocarbon material (such as methanol) may be co-injected along with the NHi precursor material to reduce the optimum temperature for the NO reduction reaction and to decrease the level of ammonia slippage The location of the injection of the NHi precursor may be at more than one level or location in the boiler to compensate for change in temperatures As is seen in FIG. 1, an injection manifold 16 is supplied by a compressor 18 which provides air to injection nozzles 20. Details of the construction of the nozzle 20 can be seen in FIGS. 2 and 3 where the compressed air enters the nozzle 20 at the air inlet 22, and exits the nozzle at the outlet 24. The NHi precursor enters the nozzle 20 at the inlet 26, passes through the nozzle 30, mixes with the air in the mixing section 28, and exits at the outlet 24.

It is preferred that means are provided for automatically controlling either the amount of hydrogen, hydrogen peroxide or hydrocarbon co-injection material, or the injection location, or both, based on the flue gas temperature sensors located in the first injection zone. Preferred injection materials are aqueous solutions of urea, or methanol, or both.

As previously discussed, the optimum temperature for SNCR processes falls within a narrow temperature window A review of prior art indicates that the optimum temperature is 1825° F., plus or minus about 75° F., or between 1750° F. and 1900° F. One possible reason for the degree of uncertainty is that temperatures measured at these high levels will read 50° F. to 150° F. too low, due to radiant heat losses from the sensing element itself, unless convective heat is added (by means of a suction pyrometer technique) whereby the true gas temperature may be measured. All temperatures herein refer to the true gas temperature as would be measured by a suction pyrometer. In the prior art of Arand et. al. (U.S. Pat. No. 4,208,386), the temperature window for urea is identified in Example I, where the optimum temperature is clearly indicated to be about 1850° F., based on plotting the NO reduction performance in Table I versus temperature.

A surprising result forming a part of the present invention is that the optimum temperature for urea is clearly less than 1670° F., and most probably is 1605° F. The optimum temperature taught by Arand et. al. is clearly incorrect. This surprising discovery suggests a process for dealing with the relatively narrow temperature window limitations previously believed to be applicable to SNCR processes. In one embodiment, a simple NHi precursor would be injected into the flue gas at higher temperatures in an upstream section of the SNCR process, followed by complex NHi precursors injected into the flue gas at lower temperatures in a downstream section of said SNCR process. In another embodiment, the simple NHi precursor would be injected at temperatures from about 1900° F. down to about 1750° F., followed by complex NHi precursors to be injected from about 1750° F. down to about 1550° F. The optimum temperature for the complex NHi precursor can be about 175° F. lower than the optimum temperature for the simple NHi precursor, thus providing a much wider temperature window than taught in the prior art. In still another embodiment, an automatic control system could be used to inject simple or complex NHi precursors into the flue gas through one or more levels of injection nozzles, based on input from flue gas temperature sensors. Another embodiment suitable for automatic control would be to inject a mixture of simple and complex NHi precursors into flue gas through one or more levels of injection nozzles, and automatically control the ratio of simple and complex NHi precursors supplied to a given level of injectors, based on the flue gas temperature measured at each level.

When more than one level of injection nozzles exists in the SNCR process, then another preferred embodiment would (1) add additional dilution water coinjected with NHi precursors, such as aqueous urea or ammonium hydroxide, move the injection location(s) toward cooler, downstream nozzles, and/or increase the use of simple NHi precursor material based on automatic control if the flue gas temperature(s) become(s) too high; or (2) reduce dilution water coinjected with NHi precursors, move the injection location(s) toward hotter, upstream nozzles, and/or increase the use of complex NHi precursor material based on automatic control if the flue gas temperature(s) become(s) too low.

Such automatic control could be provided based on input from flue gas temperature sensors, flue gas NO analyzers, or both.

Suitable means of injecting the injection materials are also provided in the present invention. Although many different techniques can be utilized, such as direct injection of liquids or gases into the flue gas, it is preferred to premix the chemicals for injection with a carrier gas such as air, steam, recirculated flue gas, or mixtures thereof The premixing is done outside the boiler in a suitable apparatus and the resulting injection fluid consists of premixed quantities of carrier gas and injection chemicals. One type of suitable apparatus used for forming the premixed injection fluid involves a carrier gas venturi such as the nozzle 20 described above, which atomizes and dispenses aqueous solutions of injection chemicals into the carrier gas. The injection fluid is pressurized for high-velocity injection into the flue gas by means of an external source, such as air or flue gas from the positive displacement compressor 18. Instead of using air, steam from a boiler can be used, if desired Pressure losses during the premixing step can be minimized by careful design of the atomizing or dispersing nozzle 20. The injection fluid is then discharged into the flue gas or air through the nozzles 20, which may be located only at the walls 32 of the boiler or, due to the cooling action of the carrier gas, may actually be located inside the flue gas zone and supported by means of an internal injection grid pipe arrangement. The actual design and location of the nozzles and injection system may depend on physical constraints imposed by the boiler, the degree of NOx removal desired, and other parameters, such as flue gas temperature, composition, and velocity distributions.

The two-stage boiler injection process of the present invention provides the surprising and important advantages of increasing the total NO conversion and decreasing the ammonia slippage compared with an SNCR process operated by itself under similar conditions Even if an SNCR process is operated under different conditions, it is not possible to provide a greater degree of NO conversion with correspondingly-less ammonia slippage than could be provided by the two-stage boiler injection process of the present invention operating at similar conditions. Conversely, the Jones process for oxidation of NO to $NO_2$ might be able to achieve rather high levels of NO conversion, but if even a small amount of NO reduction to nitrogen is carried out in an upstream SNCR process, then the overall NO conversion efficiency of the two-stage process of the present invention is higher than if the Jones process were operated by itself. The surprising advantages of significantly-decreased ammonia slippage are not disclosed in prior art. A further advantage of the two-stage boiler injection process is that residual NO converted to $NO_2$ in the second stage can be removed by wet scrubbing or other techniques disclosed in the prior art of Jones, thereby producing very high levels of NOx removal performance (i.e., 80% or more) without the difficulty of correspondingly-higher levels of ammonia slippage resulting from operation of an SNCR process by itself. These and other advantages of the present invention are described in the specific embodiments which follow.

The two-stage boiler injection process for NOx control has received considerable interest for commercial applications involving both coal-fired boilers and solid-waste incinerators. It has been determined that coal-fired boiler applications are generally easier than solid waste incinerators, since there are higher initial NOx levels requiring somewhat less chemical-to-NOx molar ratios for the same levels of performance, and somewhat lower carbon content in the flyash resulting in more effective methanol utilization in the second stage. By way of example, a detailed description is provided for application of the two-stage boiler injection process in a solid-waste incineration system, to achieve 72% NOx removal without wet scrubbing, and 81% NOx removal with wet scrubbing of the downstream flue gas.

EXAMPLE I

Conditions in an actual 300 ton/day municipal solid waste incinerator were modeled in a combustion tunnel to determine the exact performance of the two-stage boiler injection process for NOx control. These tests included injection of flyash collected from the electrostatic precipitator at the incinerator site, to determine the effects of the ash on the process chemistry. The ash injection was about 3.0 grains/SCF, or nearly 7,000 mg/normal m$^3$ (Nm$^3$).

Initial flue gas composition prior to the injection process in the zone 34 (Zone A) shown in the boiler of FIG. 1 is typically as follows (volume percent, dry basis):

| | | | |
|---|---|---|---|
| NO | 125 ppm | HCl | 840 ppm |
| NO$_2$ | 5 ppm | SO$_2$ | 60 ppm |
| NOx | 130 ppm | SO$_3$ | 3 ppm |
| CO | 30 ppm | HF | 15 ppm |
| O$_2$ | 12% | Ash | 7,000 mg/Nm$^3$ |
| CO$_2$ | 10% | | |

The flue gas water vapor content is typically 9% by volume.

In the first stage injection zone, an aqueous solution of urea or ammonium hydroxide is injected into the crossflowing flue gas using an apparatus (such as the one described above and shown in FIGS. 1, 2 and 3) for premixing the injection chemical and carrier gas such as air or steam. As shown in FIG. 1, the rotary blower 18 is used in this example to provide compressed air as a carrier to the injection nozzles via the manifold 16. The amount of carrier gas is about 6% by weight of the total flue gas flow from the incinerator. The injection chemical is mixed with the carrier gas in the injection nozzle 20. The injection nozzle 20 penetrates the boiler wall 32 and includes carrier gas and injection chemical connection points 22 and 26, respectively, means 38 for removing the chemical injection nozzle 30 for maintenance outside of the boiler, means 30 (the chemical injection nozzle 30) for atomizing and/or dispersing and premixing the injection chemical with the carrier gas in the venturi section 40 of the nozzle 20 located upstream from the outlet 24. The outlet 24 is designed to provide high-velocity injection of premixed quantities of carrier gas and injection chemical (NHi precursor or peroxyl initiator). In a preferred embodiment, best seen in FIG. 4, the injection nozzle operates at sonic or subsonic velocities, and tangentially-orientated sidewall injectors 42 are used to provide a tangential flow pattern to promote rapid mixing and to induce a helical flow pattern in the bulk flue gas flow. It would be obvious to provide converging-diverging nozzles for supersonic injection velocities, or to provide an internal injection pipe and multiple nozzles located throughout the flue gas cross-section to promote improved mixing and/or better cross-sectional coverage, if necessary Although the present example describes the use of a dilute aqueous urea solution for the first stage of the two-stage injection process, another alternative would be to use an aqueous ammonium hydroxide solution. The ammonium hydroxide would release NH$_3$ vapor immediately upon heating in the flue gas zone, whereas the NH$_2$ liberated upon thermal decomposition of urea (chemical formula (NH$_2$)$_2$CO) would not take place until sufficient water evaporation from the droplets results in urea supersaturation and/or crystallization in the droplets. Therefore, by increasing the dilution or the droplet size, the release of NH$_2$ from the urea solution into the flue gas can be delayed to a certain extent to allow more intimate mixing with the flue gas and, consequently improved cross-sectional coverage. This may provide advantages compared with ammonium hydroxide depending on size of boiler, NOx control requirement, degree of temperature and velocity maldistributions, injection nozzle locations and residence time constraints.

Figure 6:
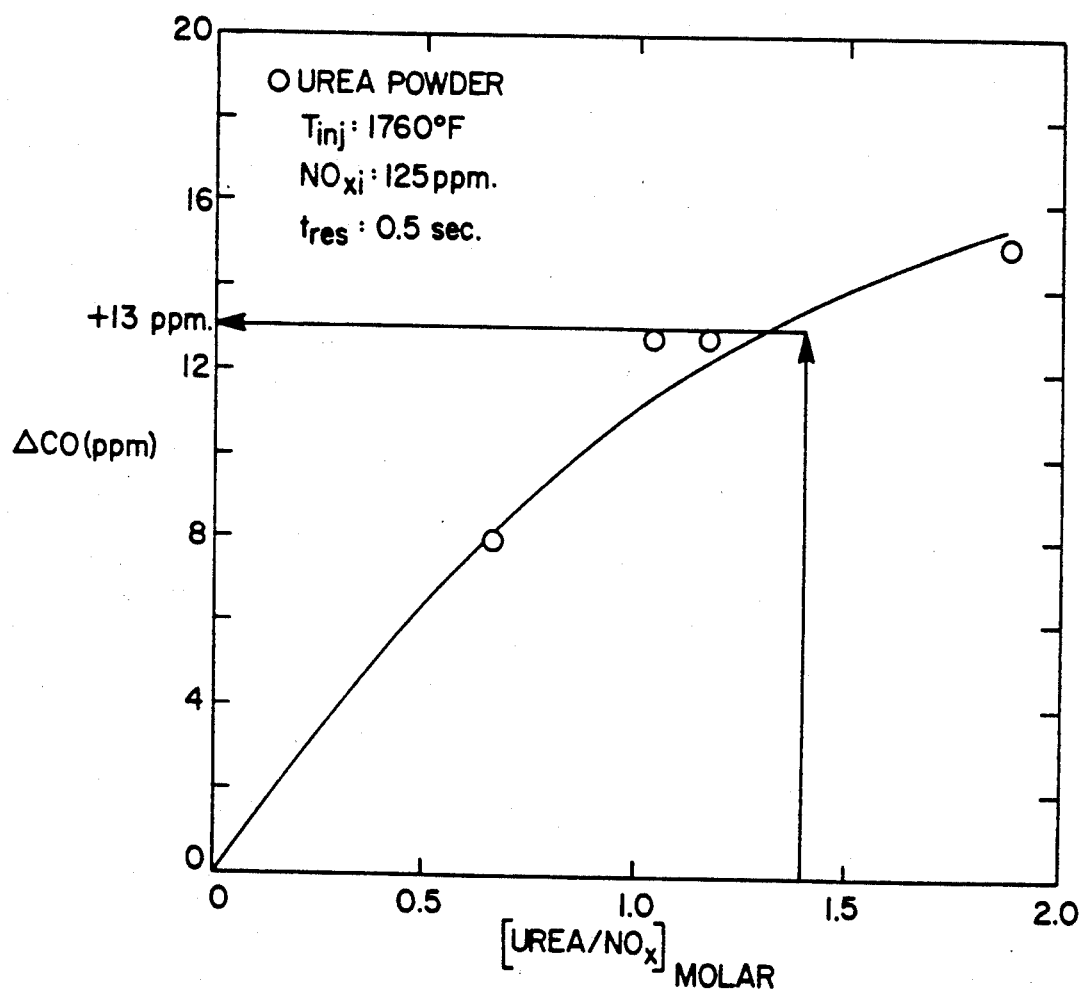
FIG. 6 is a graph showing the change in CO in parts per million (ppm) as a function of the molar ratio of the urea injected into the flue gas to the NOx concentration in the flue gas at 1760° F.

As shown in the graph of FIG. 5, a molar ratio of urea to NO of 1.4 produced 72% conversion of NO to nitrogen at 1670° F. from an initial level of 125 ppm NO. Also shown in FIG. 5 is an ammonia slip of 35 ppm at a urea/NO molar ratio of 1.4. In FIG. 6 it is shown that at an injection temperature of 1760° F. and at a urea/NO molar ratio of 1.4, a corresponding increase in CO emission of 13 ppm is also produced. At this point, the change in flue gas composition is as follows:

| | Zone A, FIG. 1<br>Before First Stage Injection | Zone B, FIG. 1<br>After First Stage Injection |
|---|---|---|
| NO | 125 ppm | 35 ppm |
| NO$_2$ | 5 ppm | 5 ppm |
| NOx | 130 ppm | 40 ppm |
| CO | 30 ppm | 43 ppm |
| NH$_3$ | zero | 35 ppm |

Figure 7:
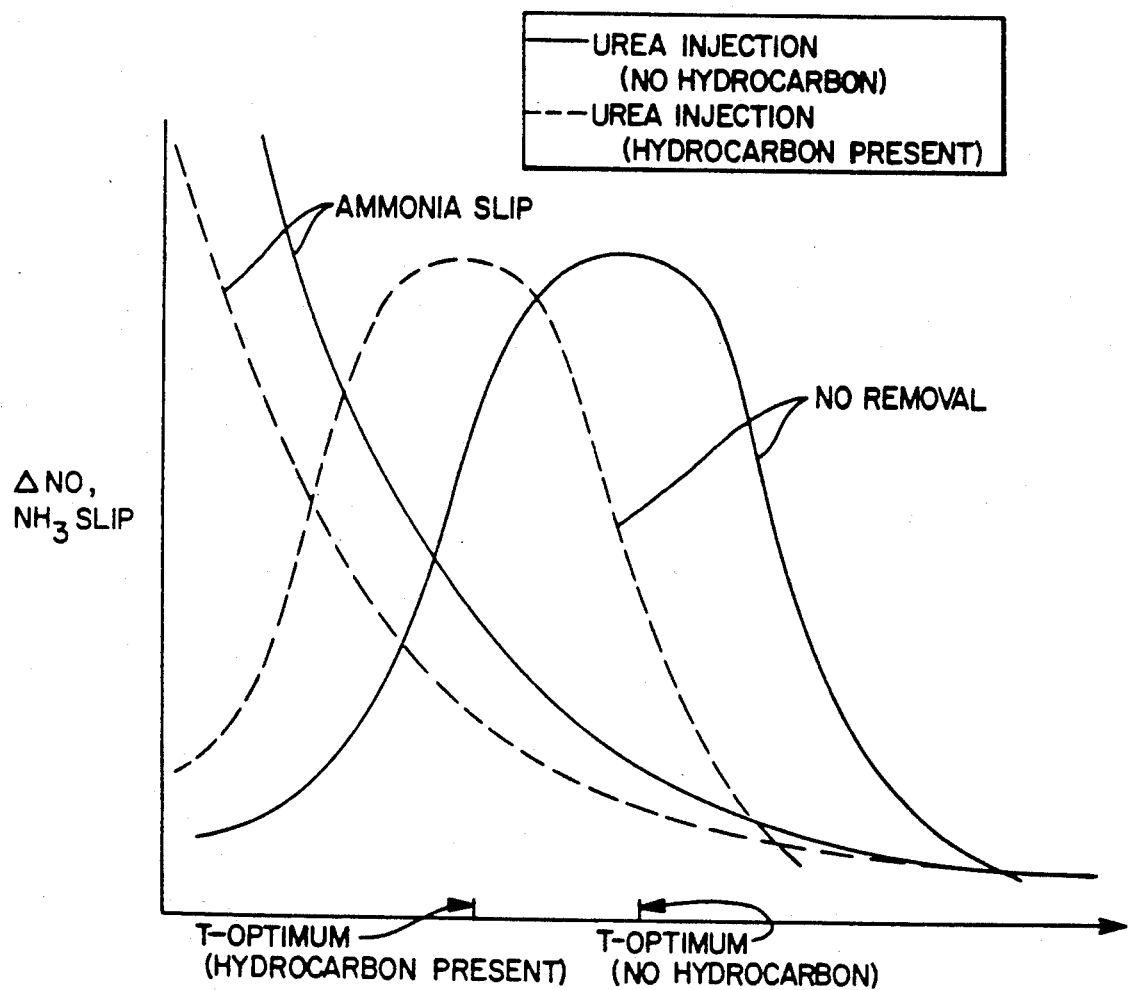
FIG. 7 is a graph showing the optimum temperature for reduction in NO and ammonia slip with and without hydrocarbon present when urea is injected in accordance with practice of principles of the present invention.

In the event that the temperature in the first stage injection zone 12 departs from optimum levels, the NOx removal performance will deteriorate unless corrective action is initiated Among these actions would be automatic control of the location in the boiler where the urea is injected, based on temperature sensor input and using more than one level of injection, as shown in FIG. 1. Another alternative is to co-inject a hydrocarbon material with the NHi precursor chemical to provide a reduction in the optimum temperature. This effect is shown schematically in FIG. 7, where it is seen that without hydrocarbon coinjection, if the temperature falls below the optimum level, then NH$_3$ slippage increases dramatically, and NO removal performance deteriorates dramatically. These two adverse effects can be compensated for at temperatures in the range of from 1400° F. to 1800° F. by co-injection of injection of hydrogen or hydrogen peroxide will also produce the same effect. In the preferred embodiment of this example, methanol is admixed with the aqueous urea solution for co-injection of hydrocarbon, and the amount of methanol is automatically controlled, based on input signals from temperature sensors.

Figure 8:
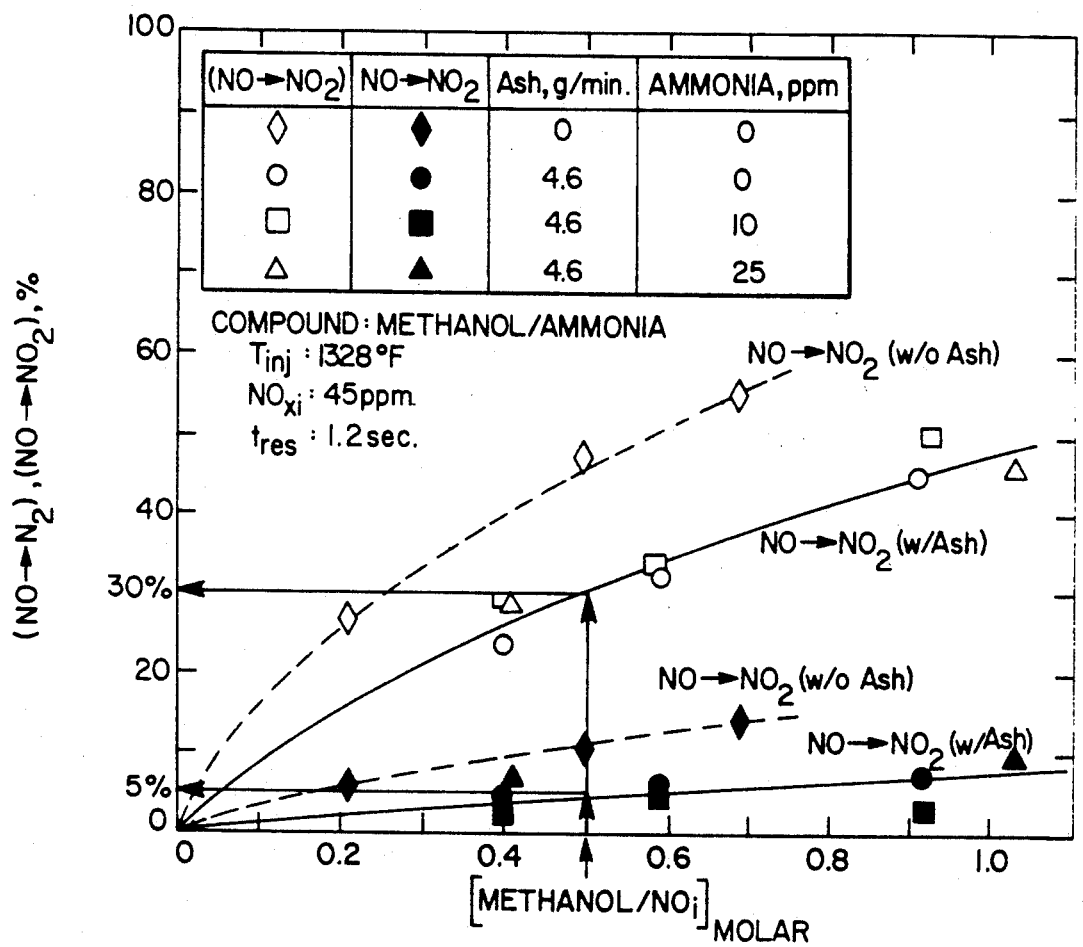
FIG. 8 is a graph showing the percent of NO to $N_2$ and NO to $NO_2$ conversion as a function of the molar ratio of methanol injected into the flue gas to the NOi concentration in the flue gas at an injection temperature of 1328° F.

Returning to the example and referring to FIG. 8, a molar ratio of methanol to NO of 0.5 at the inlet to the second stage injection zone produces 30% conversion of NO to NO$_2$, plus 5% conversion of NO to nitrogen at 1328° F. in the presence of 7,000 mg/Nm³ of incinerator flyash and 25 ppm of ammonia. The flyash in known to contain unburned carbon, which tends to interfere somewhat with the effectiveness of the second stage NO conversion efficiency. As shown in FIG. 8, when ash is not present (or when the carbon content of the ash is very low) the same molar ratio of methanol to NO (about 0.5) produces about 45% conversion of NO to $NO_2$, plus about 7% conversion of NO to nitrogen at 1328° F. in the presence of 25 ppm of ammonia. The ammonia is present at the second stage due to ammonia slip from the first stage.

Figure 9:
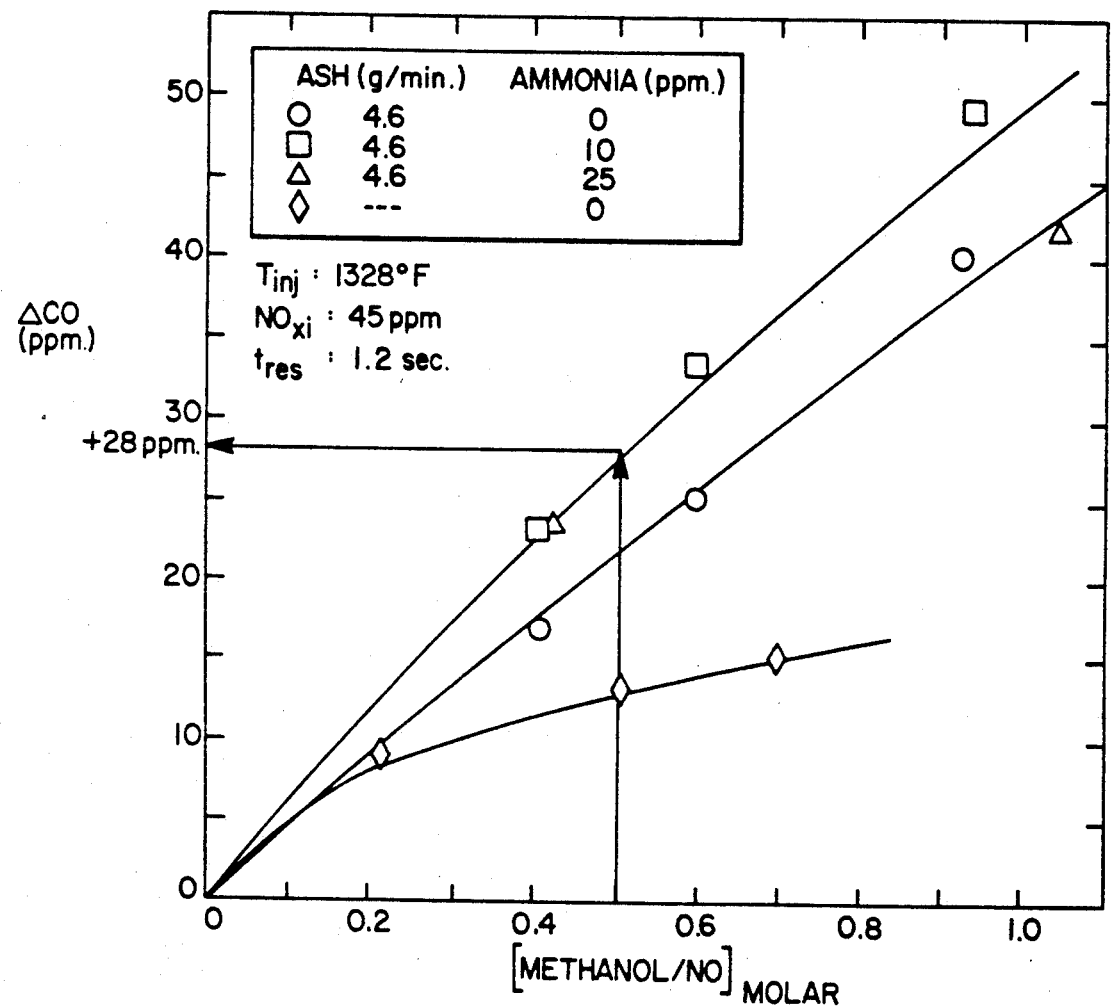
FIG. 9 is a graph showing the change of CO concentration as a function of the molar ratio of the methanol injected into the flue gas to the NO concentration in the flue gas at an injection temperature of 1720° F.
Figure 10:
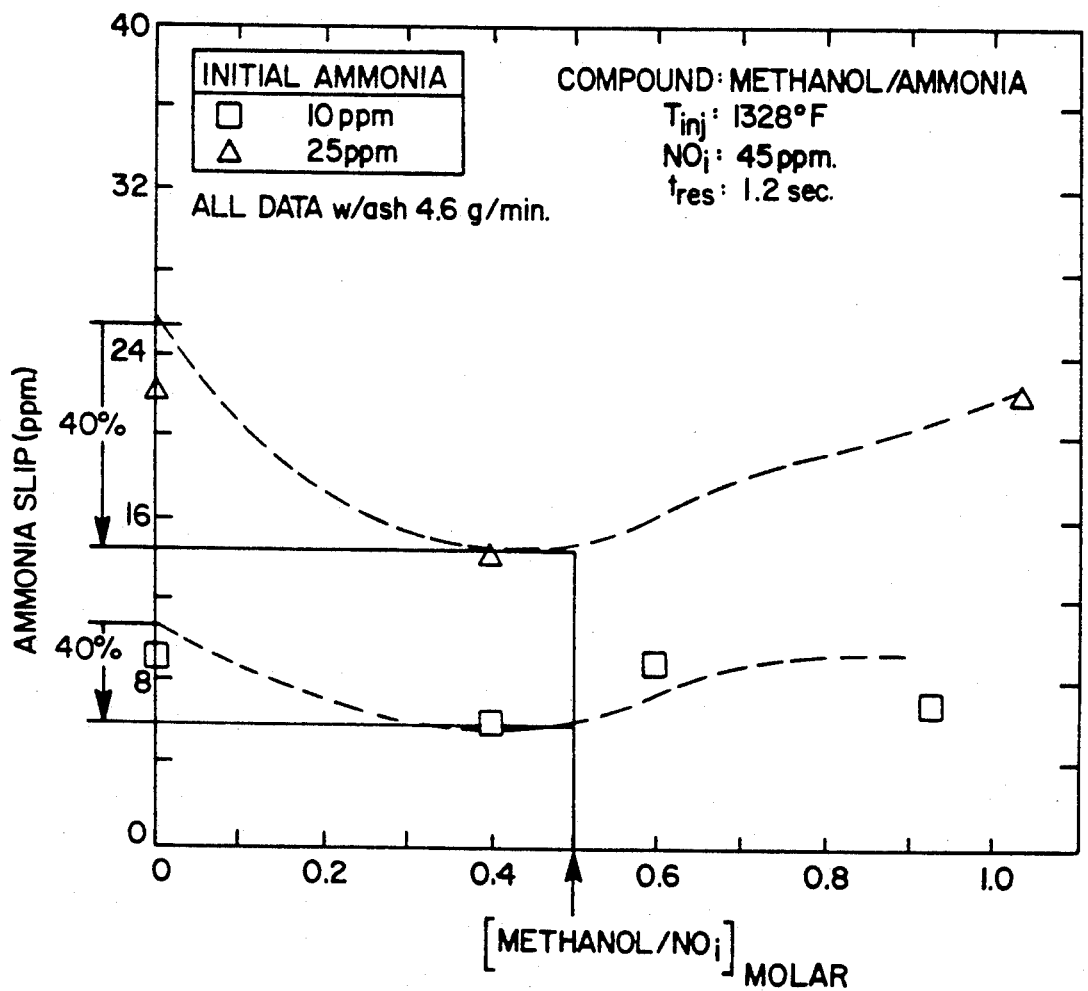
FIG. 10 is a graph showing the ammonia slip in parts per million as a function of the molar ratio of methanol injected into the flue gas to the NOi concentration in the flue gas at 1328° F.

Ammonia slip is reduced in the second stage injection zone according to FIG. 10, where 40% reduction was measured in actual combustion tunnel tests, including flyash injection. CO emissions were observed to increase by 28 ppm in FIG. 9, where the effect of the flyash is seen to cause a significant increase in CO emissions, compared with ashfree (or low carbon ash) conditions. At this point, the changes in flue gas composition, using a molar ratio of urea/NO in the first stage of 1.4, and a molar ratio of methanol/NO in the second stage of 0.5, are as follows:

|  | Zone A, FIG. 1 Before First Stage Injection | Zone B, FIG. 1 After First Stage and Before Second Stage Injection | Zone C, FIG. 1 After Second Stage Injection |
|---|---|---|---|
| NO | 125 ppm | 35 ppm | 22 ppm |
| $NO_2$ | 5 ppm | 5 ppm | 15 ppm |
| $NO_x$ | 130 ppm | 40 ppm | 37 ppm |
| CO | 30 ppm | 43 ppm | 71 ppm |
| $NH_3$ | zero | 35 ppm | 21 ppm |

$$\frac{Urea}{NO} = 1.4 \text{ molar}$$

Temp = 1670° F.

$$\frac{Methanol}{NO} = 0.5 \text{ molar}$$

Temp = 1330° F.

The $NO_x$ removal at this point is 72%. Assuming that 80% of the $NO_2$ is removed in a downstream wet scrubber or spray dryer, the overall $NO_x$ removal becomes 81%, from 130 ppm to 25 ppm. This level of $NO_x$ removal performance is directly competitive with catalyst-based SCR processes, and is much higher than the 69% $NO_x$ removal (i.e., 130 ppm to 40 ppm) which would be anticipated operating an SNCR process under similar conditions in a high-temperature, one-stage injection zone.

EXAMPLE II

Tests were conducted in a 0.5 MMBTU/hr quartz-lined combustion tunnel operating at a flue gas flow rate of about 25 SCFM. Nitric oxide was injected with the main combustion air, ammonia was injected with dilution air at the throat section, and methanol was injected 11 inches downstream using a carrier gas. Tests were performed at a flue gas temperature of 1200° F. at the methanol injection location. The flue gas was sampled at the combustion tunnel exit using two water-cooled probes; one for the continuous gas analyzer system, and one for the ammonia sampling system. The gas residence time was about one second in the combustion tunnel. Ammonia was determined by passing combustion products through an impinger containing dilute sulfuric acid and analyzing the impinger solutions for ammonia with an ion-specific electrode. Ammonia concentrations were determined on the basis of the average of triplicate samples. The results are shown in Table 1.

TABLE 1

| Testing Conditions: | | | | | | | |
|---|---|---|---|---|---|---|---|
| Firing Rate: | | | 0.5 MMBTU/hr | | | | |
| Fuel: | | | Natural Gas | | | | |
| Burner System: | | | Quartz-Lined Combustion Tunnel | | | | |
| Inj. Temp: | | | 1200° F. | | | | |
| Methanol/NO Molar: | | | 2.2 | | | | |
| | | ppmv concentrations | | | | | |
| Results: | NO | $NO_2$ | $NO_x$ | $NH_3$ | % $NO_x$-Red. | % $NH_3$-Red. | |
| 1. Baseline Conditions | 294 | 5 | 299 | 0 | n/a | n/a | |
| 2. $NH_3$ Injection Only | 288 | 5 | 293 | 90 | 2% | 0% | |
| 3. Methanol Inj. Only | 15 | 218 | 233 | 0 | 22% | n/a | |
| 4. Calculated % $NO_x$-Red. | 2% + (22% × 98%) = 23.6% | | | | | | |
| 5. Actual % $NO_x$-Red. Using Two-Stage Injection | 15 | 197 | 212 | 41 | 29% | 54% | |

Although the 1200° F. temperature is too low to allow any reasonable amount of NO reduction to nitrogen with ammonia injection, in fact about 2% was achieved. The methanol-only injection of the Jones process achieved 22% NO reduction to nitrogen. When these two independent results are totalled, the combined two-stage process provided by practice of principles of the present invention would be expected to produce 23.6% NO reduction to nitrogen. In actual fact, 29% NO reduction to nitrogen was achieved, surpassing all expectations at 1200° F. The prior art does not disclose boiler injection processes that achieve 29% NO reduction to nitrogen at such low molar ratios or at such a low temperature. In addition, 54% $NH_3$ reduction was observed at the same time. During operation of the two-stage injection system NO addition stopped, and the degree of $NH_3$ reduction dropped from 54% to only 10%. The presence of $NO_2$ is suspected as being important for high levels of ammonia slippage reduction.

EXAMPLE III

Additional tests were conducted in a 10 MMBTU/hr crude oil-fired boiler. Crude oil containing 1.2% sulfur was burned using a steam-atomized burner gun. Aqueous urea was injected into the upper furnace at a temperature of about 1550° F. Methanol was injected as shown in FIG. 1 between adjacent boiler tubes in a region where the crossflowing flue gas temperature was 1180° F. The molar ratio of urea to $NO_x$ was about 0.3, and the molar ratio of methanol to $NO_x$ was about 1.7. Flue gas was sampled at the exit of the boiler using a iced impinger and continuous chemiluminescent NO-NOx analyzer. The results are shown in Table 2.

TABLE 2

| Testing Conditions: | | |
|---|---|---|
| Firing Rate: | 10 MMBTU/hr | |
| Fuel: | Crude Oil | |
| Burner System: | Boiler and Steam-Atomized Burner | |
| Inj. Temp: | 1180° F. | |
| Methanol/NO Molar: | 1.7 | |
| Urea/NO Molar: | 0.3 | |

| Results: | ppmv concentrations | | | |
|---|---|---|---|---|
| | NO | NO$_2$ | NOx | % NOx-Red. |
| 1. Baseline Conditions | 270 | 10 | 280 | n/a |
| 2. Urea Injection Only | 235 | 10 | 245 | 13% |
| 3. Methanol Inj. Only | 70 | 151 | 221 | 21% |
| 4. Calculated % NOx-Red. | 13% + (21% × 87%) = 30% | | | |
| 5. Actual % NOx-Red. Using Two-Stage Injection | 55 | 135 | 190 | 32% |

Although 1550° F. is still quite low for SNCR processes, and even though the urea injector provided poor flue gas cross-sectional coverage, 13% NO reduction to nitrogen was achieved with urea-only in the first injection zone. The methanol-only injection in the second zone produced 21% reduction of NO to nitrogen The anticipated percentage of NOx reduction, based on calculation, was 30%. The actual percentage of NOx reduction using the two-stage injection process of this invention was 32%. The 32% benefit of NO conversion to nitrogen occurred at 1180° F., well below the previously-identified lowest temperature threshold for SNCR technology of 1300° F. Again, the prior art does not disclose boiler injection processes that achieve 32% NO reduction to nitrogen at temperatures as low as 1180° F.

The above descriptions of preferred embodiments for removing NOx from flue gas streams are for illustrative purposes. Because of variations which will be apparent to those skilled in the art, the present invention is not intended to be limited to the particular embodiments described above. The scope of the invention is defined in the following claims.

What is claimed is:

1. A method for reducing NOx in combustion effluent gases consisting essentially of two injection steps, the injection steps comprising:
   (a) injecting one or more NHi precursor materials selected from the group consisting of ammonia, urea, cyanuric acid, biuret, triuret, ammelide, or mixtures thereof, in the absence of peroxyl initiator materials, into a flue gas in a first injection zone, wherein the flue gas has a temperature of from about 14500° F. to about 1900° F., to thereby reduce a portion of the NO to N$_2$; and
   (b) injecting one or more hydrocarbon peroxyl initiator materials selected from the group consisting of propane, benzene, ethane, ethylene, nbutane, n-octane, methane, methanol, isobutane, pentane, acetylene, methyl alcohol, ethyl alcohol, acetone, glacial acetic acid, ethyl ether, propyl alcohol, nitrobenzyl alcohol, methylethylketone, propylene, toluene, formaldehyde, camphor, ether and glycol, or mixtures thereof, in the absence of NHi precursor materials, into the flue gas in a second injection zone, wherein the flue gas contains NO and NH$_3$ from the first injection zone and is at a temperature of less than about 1400° F., to thereby reduce ammonia slippage and oxidize residual NO to NO$_2$.

2. The method according to claim 1 comprising the additional step of removing NO$_2$ which exits the second injection zone by passing the gas stream containing the NO$_2$ through a wet scrubber located downstream from the second injection zone.

3. The method according to claim 1 wherein the peroxyl initiator is injected into the second zone in the form of an injection fluid comprising the peroxyl initiator and air.

4. The method according to claim 1, wherein the NHi precursor materials are mixed together with a carrier gas prior to introduction into the first injection zone and the peroxyl initiator materials are mixed together with a carrier gas prior to their introduction into the second injection zone, and such premixing takes place outside of the injection zones.

5. The method according to claim 4, wherein the flue gas in produced by a boiler and the NHi precursor material/carrier gas mixture, and the peroxyl initiator/carrier gas mixture, are both injected into a cross-flowing flue gas by means of wall jets located at the boiler walls.

6. The method according to claim 5, including the step of providing wall jets that are tangentially oriented to provide a tangential swirl to the flue gas as the NHi precursor/carrier gas mixture and the peroxyl initiator/carrier gas mixture are introduced.

7. The method according to claim 4, wherein the flue gas is produced by a boiler and the NHi precursor material/carrier gas mixture and the peroxyl initiator/carrier gas mixture are both injected into a cross-flowing flue gas through internal injection grid pipes and nozzles.

* * * * *

UNITED STATES PATENT AND TRADEMARK OFFICE
CERTIFICATE OF CORRECTION

PATENT NO. : 5,240,689

DATED : August 31, 1993

INVENTOR(S) : Dale G. Jones

It is certified that error appears in the above-identified patent and that said Letters Patent is hereby corrected as shown below:

Column 12, line 1, change "14500" to -- 1400 --;

Signed and Sealed this

Seventeenth Day of May, 1994

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,240,689

DATED : August 31, 1993

INVENTOR(S) : Dale G. Jones

It is certified that error appears in the above-identified patent and that said Letters Patent is hereby corrected as shown below:

On the Title Page:

[56] References Cited, U.S. PATENT DOCUMENTS, line 17, change "4,802,059" to -- 4,803,059 --.

```
Column 1,  line 34,   after "Germany" insert a period;
Column 1,  line 48,   after "byproducts" insert a period;
Column 2,  line 23,   after "reference" insert a period;
Column 2,  line 68,   after "maximized" insert a period;
Column 3,  line 23,   before "1400°F" delete "to" and insert
                      -- and --;
Column 3,  line 30,   after "reaction" delete "ps";
Column 4,  line 38,   change "liquidphase" to
                      -- liquid-phase --;
Column 4,  line 54,   after "slippage" insert a period;
Column 5,  line 7,    after "window" insert a period;
Column 6,  line 10,   after "thereof" insert a period;
Column 6,  line 21,   after "desired" insert a period;
Column 6,  line 40,   after "conditions" insert a period;
Column 7,  line 22,   after "injection" insert -- rate --;
```

UNITED STATES PATENT AND TRADEMARK OFFICE
CERTIFICATE OF CORRECTION

PATENT NO. : 5,240,689

DATED : August 31, 1993

INVENTOR(S) : Dale G. Jones

It is certified that error appears in the above-identified patent and that said Letters Patent is hereby corrected as shown below:

```
Column 7,   line 40,   change "crossflowing" to
                       -- cross-flowing --;
Column 8,   line 45,   after "initiated" insert a period;
Column 8,   line 58,   before "injection" insert -- hydrocarbon.
                       If CO emissions are a limiting factor, co- --;
Column 9,   line 2,    before "known" change "in" to -- is --;
Column 9,   line 19,   change "ashfree" to -- ash-free --;
Column 10,  line 65,   change "crossflowing" to
                       -- cross-flowing --;
Column 10,  line 68,   after "using" change "a" to -- an --;
Column 11,  line 25,   after "nitrogen" insert a period.

Column 12,  line 5,    change "nbutane" to -- n-butane --;
Column 12,  line 36,   before "produced" change "in" to
                       -- is --.
```

Signed and Sealed this

Eighteenth Day of April, 1995

Attest:

BRUCE LEHMAN

Attesting Officer

Commissioner of Patents and Trademarks